UNITED STATES PATENT OFFICE.

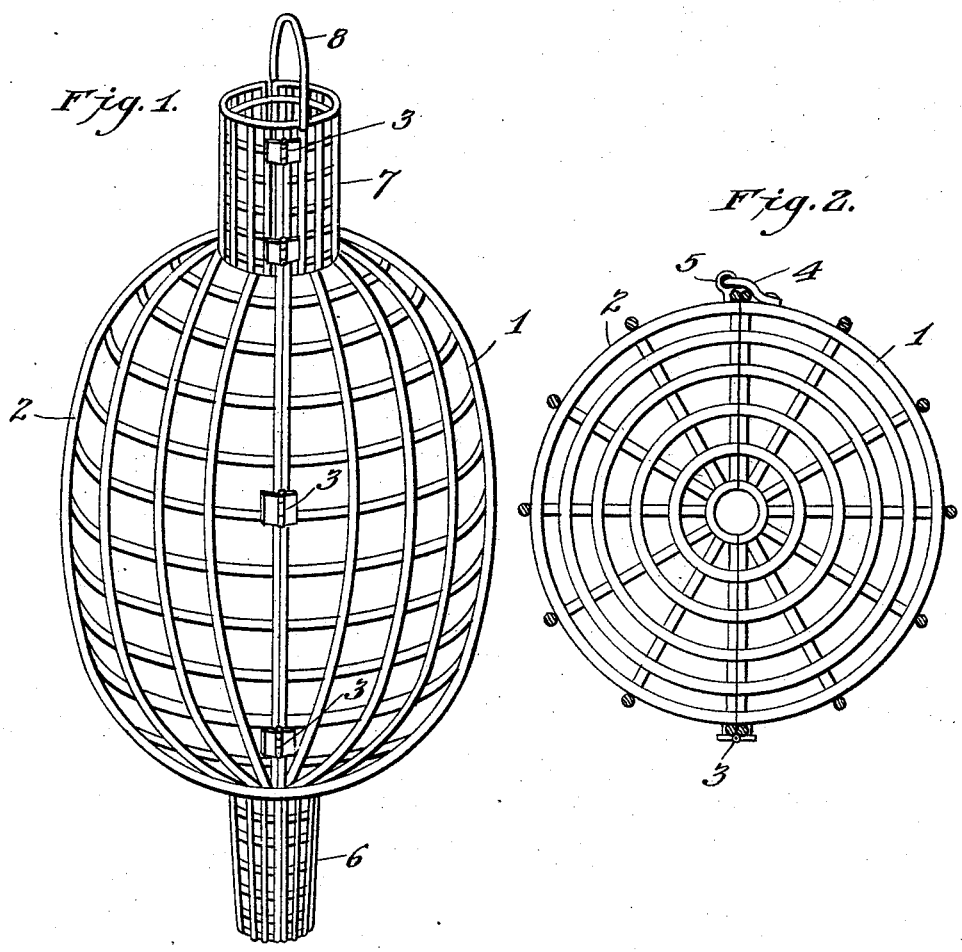

JOHN F. BEATTY, OF MORTON, PENNSYLVANIA.

POULTRY-SECURING DEVICE.

933,817. Specification of Letters Patent. Patented Sept. 14, 1909.

Application filed December 26, 1908. Serial No. 469,403.

*To all whom it may concern:*

Be it known that I, JOHN F. BEATTY, a citizen of the United States, residing at Morton, in the county of Delaware and State of Pennsylvania, have invented certain new and useful Improvements in Poultry-Securing Devices, of which the following is a specification.

My invention relates to an improved poultry securing device, and more particularly to a casing to be secured around the body of the fowl, with its head projecting out at one end, and its legs out of the other, so as to enable the fowl to be easily killed and prevented from flapping about, and hence prevent spattering of blood and bruising the fowl.

With this object in view, the invention consists in certain novel features of construction, and combinations, and arrangements of parts as will be more fully hereinafter described and pointed out in the claims.

In the accompanying drawings, Figure 1, is a perspective view illustrating my improvements, and Fig. 2, is a view in cross section.

My improved device comprises two half sections 1 and 2 composed preferably of wire netting, and connected at one side by a series of hinges 3 to enable the sections to be swung apart and admit the fowl. The other edges of the sections 1 and 2 are provided with hooks 4 and eyes 5 to securely clamp the casing around the body of the fowl.

One end of the casing is made in the form of a restricted neck 6 to inclose the neck portion of the fowl, leaving its head protruding in convenient position for killing. The opposite end of the casing is made in the form of a somewhat larger neck portion 7 to surround the legs of the fowl, and a bail 8 is secured on this neck portion 7 and is adapted to suspend the casing with the fowl therein, while it is being killed.

It will be observed that the casing acts as a straight jacket to prevent any movement of the fowl, and hence prevent it from bruising itself and spattering the blood about, as would be the case if the fowl were left free to flutter about.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. A device of the character described, comprising two half sections hinged together and forming a fowl receiving casing, having restricted necks at its opposite ends.

2. A device of the character described, comprising two half sections of wire netting hinged together, means for securing the sections together and around the body of a fowl, restricted neck portions at the ends of the casing, and a bail secured to one of said neck portions.

In testimony whereof I have signed my name to this specification in the presence of two subscribing witnesses.

JOHN F. BEATTY.

Witnesses:
R. H. KRENKEL,
J. A. L. MULHALL.